United States Patent
Hasegawa et al.

(10) Patent No.: US 7,001,252 B2
(45) Date of Patent: Feb. 21, 2006

(54) ABRASIVE MATERIAL

(75) Inventors: Kou Hasegawa, Tokyo (JP); Hozumi Satou, Tokyo (JP); Osamu Ishikawa, Tokyo (JP); Yukio Hosaka, Tokyo (JP)

(73) Assignee: JSR Corporation, Tokyo (JP)

( * ) Notice: Subject to any disclaimer, the term of this patent is extended or adjusted under 35 U.S.C. 154(b) by 281 days.

(21) Appl. No.: 10/030,141

(22) PCT Filed: May 29, 2001

(86) PCT No.: PCT/JP01/04483

§ 371 (c)(1),
(2), (4) Date: Nov. 15, 2002

(87) PCT Pub. No.: WO01/91975

PCT Pub. Date: Dec. 6, 2001

(65) Prior Publication Data

US 2003/0153255 A1      Aug. 14, 2003

(30) Foreign Application Priority Data

May 31, 2000 (JP) ............................. 2000-161519

(51) Int. Cl.
*B24B 7/22* (2006.01)
(52) U.S. Cl. ........................... 451/41; 451/526; 51/298
(58) Field of Classification Search ................ 451/526, 451/527, 533, 41; 51/297, 298, 293, 307–309; 428/323, 327
See application file for complete search history.

(56) References Cited

U.S. PATENT DOCUMENTS 6,077,581 A * 6/2000 Kuramochi et al. ....... 428/64.1
6,361,403 B1 * 3/2002 Kuramochi et al. .......... 451/41

FOREIGN PATENT DOCUMENTS

| JP | 2-262965 | 10/1990 |
|---|---|---|
| JP | 3-281172 | 12/1991 |
| JP | 5-222356 | 8/1993 |
| JP | 6-254769 | 9/1994 |
| JP | 8-294869 | 11/1996 |
| JP | 10-6231 | 1/1998 |
| JP | 10-329032 | 12/1998 |
| JP | 11-151659 | 6/1999 |
| JP | 11-188647 | 7/1999 |
| JP | 11-198045 | 7/1999 |
| JP | 2000-301461 | 10/2000 |
| WO | WO 99/24218 | 5/1999 |

* cited by examiner

*Primary Examiner*—Robert A. Rose
(74) *Attorney, Agent, or Firm*—Oblon, Spivak, McClelland, Maier & Neustadt, P.C.

(57) ABSTRACT

An object of the present invention is to provide a polishing body, wherein the abrasive in the polishing body are extremely dispersed well, which provides stable polishing performance in the polishing process, and which can effectively reduce the occurrence of scratches even in a case a large quantity of the abrasive are contained. A polishing part constituting the polishing body in the invention is produced obtained by loading predetermined amounts of butadiene, styrene, methyl methacrylate, itaconic acid, acrylic acid, α-methylstyrenedimer, and t-dodecylmercaptan in an autoclave, making the mixture react for 16 hours at 75° C. to obtain an emulsion wherein a copolymer is dispersed, adjusting this emulsion to pH8.5, incorporating cerium oxide powder with an average primary particle diameter of 0.3 μm and stirring to obtain an aqueous dispersion, drying this aqueous dispersion by spreading it thinly across a film, and mold pressing the dried product obtained. The above-mentioned polishing part may have a crosslinked structure. The polishing body in the invention can be used favorably in a polishing pad and the like, for polishing the surface of a semiconductor wafer or the like.

22 Claims, No Drawings

ABRASIVE MATERIAL

FIELD OF THE ART

This invention relates to a polishing body, and to be more specific, relates to a polishing body wherein abrasive in the polishing body are extremely dispersed well. The polishing body in the invention can be used favorably as a polishing pad and the like for the polishing of the surfaces of semiconductor wafers and the like.

BACKGROUND ART

Chemical mechanical polishing, also referred to as CMP, has been conventionally used for polishing the surfaces of semiconductor wafers and the like. In CMP, polishing is performed by sliding while pressing a surface to be polished of the wafer and the like against a disk-like polishing pad and at the same time, pouring a slurry (aqueous dispersion) wherein abrasive is dispersed, onto the polishing pad. However, it is difficult to supply the slurry, which is poured from above, between the surface to be polished and the polishing surface of the polishing pad, which are pressed against each other at high pressure, and it is said that the actual amount of functioning polishing agent is less than 1% of the total amount supplied. Moreover, this slurry is expensive and furthermore, vast costs are required for the treatment of used slurry.

Polishing body and the like that contain abrasive have been disclosed in Japanese Unexamined Patent Publication No. Hei-5-222356, Japanese Unexamined Patent Publication No. Hei-8-294869, Japanese Unexamined Patent Publication No. Hei-10-329032, Japanese Unexamined Patent Publication No. Hei-11-151659, Japanese Unexamined Patent Publication No. Hei-11-188647 and the like. However, with all of these cases, adequate prevention of scratching on the surface to be polished is considered to be difficult to achieve.

DISCLOSURE OF THE INVENTION

The present invention solves the above problems. And it is intended to provide a polishing body wherein abrasive is extremely dispersed well, which provides stable polishing performance in the polishing process, and which can effectively reduce the occurrence of scratches on the surface to be polished.

The present invention attains the object described above and can be described as follows.
1. A polishing body having a polishing part that is formed by solidifying an aqueous dispersion wherein a matrix material and abrasive are dispersed and contained respectively.
2. The polishing body according to 1 above, wherein the polishing body is used for the polishing of semiconductors.

The above-mentioned polishing part may be one obtained by drying the above-mentioned aqueous dispersion and forming the dried product. The above-mentioned aqueous dispersion may be one obtained by dispersing abrasive in an emulsion in which a matrix material is dispersed. The above-mentioned dried product may be obtained by spray drying of the above-mentioned aqueous dispersion. The above-mentioned polishing part may be a plate-like part and a supporting part may be laminated onto one surface of the polishing part.

3. A polishing body having a polishing part that is formed by solidifying an aqueous dispersion containing dispersed composite particles wherein abrasive is attached to a matrix material.
4. The polishing body according to 3 above, further a matrix material and/or abrasive are dispersed and contained in the above-mentioned aqueous dispersion.
5. The polishing body according to 3 above, wherein the respective zeta potentials of the above-mentioned matrix material and the above-mentioned abrasive are opposite in sign and the difference of the above-mentioned zeta potentials is 5 mV or more.
6. The polishing body according to 3 above, wherein the polishing body is used for the polishing of semiconductors.

The above-mentioned polishing part may be one obtained by drying the above-mentioned aqueous dispersion and forming the dried product. The above-mentioned aqueous dispersion may be one obtained by dispersing abrasive in an emulsion in which a matrix material is dispersed. The above-mentioned dried product may be obtained by spray drying of the above-mentioned aqueous dispersion. The above-mentioned polishing part may be a plate-like part and a supporting part may be laminated onto one surface of the polishing part.

7. A polishing body having a polishing part that is formed by solidifying an aqueous dispersion wherein a matrix material comprised of a crosslinkable polymer and abrasive are dispersed and contained respectively, and a polishing part that has a crosslinked structure.
8. The polishing body according to 7 above, wherein the polishing body is used for the polishing of semiconductors.

The above-mentioned polishing part may be one obtained by drying the above-mentioned aqueous dispersion and forming the dried product. The above-mentioned aqueous dispersion may be one obtained by dispersing abrasive in an emulsion in which a matrix material is dispersed. The above-mentioned dried product may be obtained by spray drying of the above-mentioned aqueous dispersion. The above-mentioned polishing part may be a plate-like part and a supporting part may be laminated onto one surface of the polishing part.

9. A polishing body having a polishing part that is formed by solidifying an aqueous dispersion containing dispersed composite particles wherein abrasive is attached to a matrix material comprised of a crosslinkable polymer, and a polishing part that has a crosslinked structure.
10. The polishing body according to 9 above, wherein the respective zeta potentials of the above-mentioned matrix material and the above-mentioned abrasive are opposite in sign and the difference of the above-mentioned zeta potentials is 5 mV or more.
11. The polishing body according to 9 above, wherein the polishing body is used for the polishing of semiconductors.

The above-mentioned polishing part may be one obtained by drying the above-mentioned aqueous dispersion and forming the dried product. The above-mentioned aqueous dispersion may be dispersed and contained a matrix material and/or abrasive therein. The above-mentioned aqueous dispersion may be one obtained by dispersing abrasive in an emulsion in which a matrix material is dispersed. The above-mentioned dried product may be obtained by spray drying of the above-mentioned aqueous dispersion. The above-mentioned polishing part may be a plate-like part and a supporting part may be laminated onto one surface of the polishing part.

According to the polishing body in the invention, since abrasive is extremely dispersed well even in the case where a large amount of abrasive is contained, the polishing performance is stable and the occurrence of scratches can be reduced effectively.

In another mode of the invention, the polishing body that has a polishing part having a crosslinked structure shows excellent removal rate even with a cutting product since deterioration of the polishing body due to heat during a cutting process is not likely to occur. Thus this polishing body makes processing of a required small distribution of thickness and cutting such as grooving easier without lowering the polishing performance.

Furthermore according to the polishing body in another mode of the invention, the particle size distribution of a powder that is a granular product produced by spray drying, can be made narrow and uniform. The filled amount in a mold in the process of powder molding is thus made stable, thereby reducing the distribution of the weights of individual molded products, denseness distribution within a polishing body may be reduced, and a stable polishing performance for each polishing process will be obtained.

The present invention will now be described in more detail.

A polishing body in the invention is characterized in having a polishing part that is formed by solidifying an aqueous dispersion wherein a matrix material and abrasive are dispersed and contained respectively.

A polishing body in another mode of invention is characterized in having a polishing part formed by solidifying an aqueous dispersion containing dispersed composite particles wherein abrasive is attached to a matrix material. This aqueous dispersion containing composite particles may furthermore have a matrix material and/or abrasive dispersed and contained therein.

That is, the polishing body in the invention is formed by solidifying any aqueous dispersion among (1) an aqueous dispersion wherein a matrix material and abrasive are contained and dispersed separately, (2) an aqueous dispersion wherein composite particles are contained and dispersed, (3) an aqueous dispersion wherein composite particles and abrasive are contained and dispersed, (4) an aqueous dispersion wherein composite particles and a matrix material are contained and dispersed, and (5) an aqueous dispersion wherein composite particles, a matrix material, and abrasive are contained and dispersed.

The above-mentioned "matrix material" is a material comprising a matrix phase that holds the abrasive in the polishing body in the invention, and is comprised of one component or two or more components. A homopolymer or a copolymer (rubber, resin, thermoplastic elastomer and the like) may be used as the matrix material. The matrix material may be crosslinked or uncrosslinked (a crosslinkable material is included.). Examples of the matrix material may include diene-based copolymers, styrene-based copolymers, (meth)acrylic-based resins, acrylic-based copolymers, polyolefin-based resins, olefin-based copolymers, epoxy-based resins, phenol-based resins, polyimide-based resins and the like. Among these, thermoplastic resins such as (meth) acrylic-based resins, acrylic-based copolymers, polyolefin-based resins, olefin-based copolymers and the like are normally used without crosslinking. Also, epoxy-based resins, phenol-based resins, polyimide-based resins, diene-based copolymers and the like prior to curing, are crosslinkable and are uncrosslinked matrix materials. Furthermore, crosslinked products obtained by crosslinking such crosslinkable materials [for example, cured thermoplastic resins (cured epoxy-based resins, cured phenol-based resins, cured polyimide-based resins), crosslinked diene-based copolymers and the like] are crosslinked matrix materials. Any of the matrix material is preferably dispersed in the aqueous dispersion as particles with average particle diameter of 10 $\mu$m or less (and more preferably 0.3 to 3 $\mu$m).

In particular, the above-mentioned "matrix material" preferably is comprised of a crosslinkable polymer (including oligomers) and the above-mentioned polishing part preferably has formed therein a crosslinked structure, in which the crosslinkable polymer is crosslinked. In this case, the crosslinkable matrix material may be dispersed in the uncrosslinked state in the aqueous dispersion and the matrix material may be crosslinked during the process of solidifying the aqueous dispersion or after solidification of the aqueous dispersion. In performing this crosslinking, a crosslinkable oligomer and the like may be crosslinked without crosslinking agent, or a crosslinking agent may be blended in the aqueous dispersion to perform crosslinking. In these cases, crosslinking may be carried out by reaction under room temperature or by heating. Also, an uncrosslinked thermoplastic resin may be crosslinked by irradiation of radiation and the like. Such a polishing part having crosslinking structure gives little surface deterioration due to heat during a cutting process. Thus this polishing body makes processing of a required small distribution of thickness and cutting such as grooving easier without lowering the polishing performance.

A non-crosslinking component as the matrix material may be used in combination with a crosslinkable component. In this case, the amount of the crosslinkable component is 15% by mass or more, more preferably 40% by mass or more with respect to the total amount of the crosslinkable component and the non-crosslinking component. The amount less than 15% by mass of the crosslinkable component makes the effect of restraining the deterioration of the surface of the polishing body lower.

In the process of solidifying the aqueous dispersion, if integration by heating and the like is difficult due to the matrix material being a crosslinking polymer, a crosslinking copolymer or the like, the matrix material may be adhered by use of a binder. As this binder, the same copolymer and/or resin as the above-mentioned matrix material may be used. It is especially preferable to select components wherein the affinity of the matrix material and the binder is good. Examples of the binder include epoxy-based resins, phenol-based resins, polyimide-based resins, styrene-based resins, acrylic-based resins, olefin-based resins and the like.

The above-mentioned matrix material having crosslinked structure is also preferably dispersed in the aqueous dispersion as particles with average particle diameter of 10 $\mu$m or less (and more preferably 0.3 to 3 $\mu$m).

The above-mentioned "abrasive" is a particle that mainly exhibits mechanical polishing action and/or chemical polishing action. Examples of such abrasive include particles comprised of cerium oxide, silica, alumina, titanium oxide, chromium oxide, manganese dioxide, dimanganese trioxide, iron oxide, zirconium oxide, silicon carbide, boron carbide, diamond, barium carbonate and the like. Among these, cerium oxide, silica, alumina and the like, which have good affinity for water, are preferable. In particular, cerium oxide is more preferable for its good dispersion property in an emulsion.

The average particle diameter of the above-mentioned abrasive is favorably 0.001 to 100 µm (preferably 0.005 to 50 µm, more preferably 0.005 to 10 µm, and most preferably 0.01 to 1 µm). If the average particle diameter is less than 0.001 µm, the polishing effect tends to be low. Meanwhile, if the average particle diameter is exceeding 100 µm, scratch tends to cause since the abrasive are large. It is also preferable for the abrasive to have a particle diameter in the preferable range given above even in the polishing body.

The above-mentioned "composite particles" are particles wherein the abrasive is attached to the matrix material (the attachment is not limited to the surface of the matrix material). The attaching method is not restricted in particular, and for example the abrasive may be attached electrostatically by varying the zeta potential with adjustment of the pH, etc. In this case, the zeta potentials of the matrix material and the abrasive are preferably opposite in sign and the potential difference is preferably 5 mV or more (more preferably 10 mV or more, even more preferably 20 mV or more and especially preferably 30 mV or more). For this purpose, a matrix material and the abrasive, which can exhibit the above-mentioned preferable zeta potential signs and potential difference, should be selected. Also, the zeta potential of the matrix material may be made closer to the desired value (a more negative value) by the introduction of at least one type of group among the carboxyl group, sulfonic acid group, amino group, sulfuric ester group, phosphoric ester group, ether-bonded part, ester-bonded part and the like. In other words, though most zeta potentials of the matrix material are negative over all pH range or over a wide range except for a low pH range, the matrix material having a carboxyl group, sulfonic acid group and the like may have definitely a negative zeta potential. And, the matrix material having an amino group and the like can be the one having a positive zeta potential within a specific pH range. Meanwhile, the zeta potential of abrasive highly depends on pH, and has an isoelectric point at which this zeta potential becomes 0, and the signs of the zeta potential change around this isoelectric point. Thus by choosing a specific matrix material and abrasive, and mixing them in a pH range wherein their zeta potentials will be opposite in sign, the matrix material and the abrasive may be made into composite particles electrostatically. Also, even if the zeta potentials are the same in sign during mixing, by changing the pH thereafter so that the zeta potentials will be opposite in sign, the matrix material and the abrasive may be made integral.

Furthermore, after attaching the abrasive, the composite particle surface may be covered by a polycondensate of a silane coupling agent and the like preventing from eliminating of the attached abrasive. This polycondensate does not necessarily bond chemically to the composite particles, and, in particular, a polycondensate that has grown three-dimensionally may be physically held on the composite particle surface. Examples of such coated composite particles include one composited by bonding polysiloxane and the like at least on the surface of the particle after polycondensating a specific silane coupling agent and a specific alkoxysilane, aluminum alkoxide, titanium alkoxide and the like in the presence of particles that have been made into composite particles by electrostatically.

The dispersion medium of the above-mentioned "aqueous dispersion" may be just a water or a mixed dispersion medium containing other dispersion medium besides water. In the case of the mixed dispersion medium, the water content is preferably 10% by mass or more (more preferably 20 mass % or more). Examples of the dispersion medium besides water include non-protonic polar solvents, esters, ketones, phenols, alcohols, amines, and other dispersion media. The dispersion medium with a boiling point of 60 to 200° C. (preferably 60 to 160° C.) is used preferably so that excessive evaporation will not occur in the preparation of the aqueous dispersion and yet the removal of the dispersion medium can be performed readily.

The solid content of the aqueous dispersion is preferably 1 to 80% by mass (more preferably 10 to 60% by mass). Exceeding 80% by mass may lower the dispersion stability of the aqueous dispersion and precipitation may occur.

The aqueous dispersion is preferably one wherein abrasive is dispersed in an emulsion in which the matrix material is dispersed. Dispersing abrasive in the emulsion makes a polishing body with well-dispersed abrasive. The method of dispersing abrasive is not restricted in particular, and for example, the dispersion may be obtained by mixing an emulsion containing a matrix material which has been prepared by emulsion polymerization, suspension polymerization and the like, and a dispersion wherein the abrasive is dispersed. Furthermore, the aqueous dispersion may be obtained by dispersing the abrasive directly in the emulsion.

The method of producing an emulsion in which a matrix material is dispersed is not restricted in particular, for example, the emulsion may be obtained by emulsion polymerization, suspension polymerization and the like. The emulsion may also be obtained by dissolving a priorly obtained matrix material in a solvent or the like, and then dispersing the resulting solution.

Besides the dispersion medium, matrix material, abrasive and composite particles, the aqueous dispersion may contain, as option, a binder mentioned above, a surfactant, a vulcanizing agent, a vulcanization accelerator, a crosslinking agent, a crosslinking promotor, a filler, a foaming agent, hollow particles (expanding or non-expanding), which form voids, a softening agent, an antioxidant, an ultraviolet absorber, an antistatic agent, a plasticizer and the like. An oxidizing agent, a hydroxide of alkali metal, an acid, a pH adjuster, a multivalent metal ion (chelating agent), a scratch prevention agent and the like which have been conventionally contained in a slurry used in CMP, may also be contained in the aqueous dispersion.

The above-mentioned surfactant may be a cationic surfactant, an anionic surfactant or a nonionic surfactant. Examples of the cationic surfactant include aliphatic amine salts, aliphatic ammonium salts and the like. Examples of the anionic surfactant include fatty acid soaps, carboxylic acid salts such as salts of alkyl ether carboxylic acids, alkylbenzenesulfonates. Examples of the nonionic surfactant include ether type nonionic surfactants such as polyoxyethylene alkyl ethers, ether ester type nonionic surfactants such as polyoxyethylene ether of glycerin ester, and ester type nonionic surfactants such as polyethylene glycol fatty acid esters, glycerin ester and sorbitan ester. The nonionic surfactant is preferable in preventing the scratches occurrence on the surface effectively.

Examples of the above-mentioned oxidizing agent include organic peroxides such as peracetic acid, perbenzoic acid and tert-butylhydroperoxide, permanganic acid compounds such as potassium permanganate, dichromic acid compounds such as potassium dichromate, halogenic acid compounds such as potassium iodate, nitric acid compounds such as nitric acid, iron nitrate, perhalogenic acid compounds such as perchloric acid, transition metal salts such as potassium ferricyanide, persulfates, such as ammonium persulfate, heteropolyacids and the like.

Examples of the above-mentioned vulcanizing agent include sulfur (powder sulfur, precipitated sulfur, colloidal sulfur, insoluble sulfur, highly dispersible sulfur and the like), sulfur compounds (sulfur monochloride, sulfur dichloride and the like) and the like.

Examples of the above-mentioned crosslinking agent include peroxides (dicumyl peroxide, di-t-butyl peroxide and the like), oximes (p-quinone dioxime, p,p'-dibenzoylquinone dioxime and the like), polyamines (triethylene tetramine, hexamethylenediamine carbamate, 4,4'-methylene-bis-o-chloroaniline and the like), modified phenol resins (alkylphenol resins with methylol group and the like) and the like.

An organic acid is preferable as the above-mentioned acid. Examples of the organic acid include p-toluenesulfonic acid, dodecylbenzenesulfonic acid, isoprenesulfonic acid, gluconic acid, lactic acid, citric acid, tartaric acid, malic acid, glycolic acid, malonic acid, formic acid, oxalic acid, succinic acid, fumaric acid, maleic acid, phthalic acid and the like. One type of the organic acid may be used alone or in combination of two or more. An inorganic acid such as nitric acid, hydrochloric acid, sulfuric acid and the like may also be given as examples of the above-mentioned acid.

Examples of the above-mentioned pH adjuster include inorganic acids such as hydrochloric acid and sulfuric acid, and basic agents such as sodium hydroxide and potassium hydroxide.

Examples of the above-mentioned multivalent metal ions include ions of metal such as aluminum, titanium, vanadium, chromium, manganese, iron, cobalt, nickel, copper, zinc, germanium, zirconium, molybdenum, tin, antimony, tantalum, tungsten, lead and cerium. One type of such multivalent metal ions may be used alone or in combination of two or more.

Examples of the above-mentioned scratch prevention agent include biphenol, bipyridyl, 2-vinylpyridine, 4-vinylpyridine, salicylaldoxime, o-phenylenediamine, m-phenylenediamine, catechol, o-aminophenol, thiourea, N-alkyl-group-containing (meth)acrylamide, N-aminoalkyl-group-containing (meth)acrylamide, heterocyclic compounds, which have a penta-heterocyclic ring and does not have a skeleton-forming aromatic ring (7-hydroxy-5-methyl-1,3,4-triazainodolizine, etc.), heterocyclic compounds, which have a penta-heterocyclic ring and have a skeleton-forming aromatic ring (5-methyl-1H-benzotriazole, etc.), phthalazine, compounds, which have a hexa-heterocyclic ring containing three nitrogen atoms (melamine, 3-amino-5,6-dimethyl-1,2,4-triazine, etc.), and various derivatives of the compounds given above. 7-hydroxy-5-methyl-1,3,4-triazaindolizine is especially preferable as the scratch prevention agent. A surfactant may also be used as a scratch prevention agent.

The above-mentioned "solidification" normally requires a dispersion medium elimination (drying) process and a molding process. These two processes may be carried out simultaneously or separately. Or, after eliminating the dispersion medium to some extent, molding may be performed and thereafter, complete elimination of the dispersion medium may be performed. The method maybe selected as suitable in accordance with the properties of the matrix material and the like. Also, after elimination of the dispersion medium, a process of crushing the dried product further may be provided, and thereafter, the finely crushed powder may be molded.

The elimination of the dispersion medium may for example be performed by leaving in an open system and eliminating the dispersion medium naturally by evaporation. The evaporation of the dispersion medium may furthermore be promoted by heating, depressurizing and the like.

The dispersion medium may also be eliminated by the spray drying method. By this method, the dispersion medium can be evaporated rapidly and granulation can be performed at the same time. This spray drying method is the one the prescribed aqueous dispersion is made into a fine mist which is then ejected into hot air or vacuum to obtain a powdery dry powder (granulated product) instantaneously. Using this spray drying method, the crushing process after the drying process can be omitted, the particle size distribution of the powder can be made narrow and uniform, and as result, the amount filled into a mold in the process of performing powder molding can be stabilized and the distribution of the weights of individual molded products can be reduced. Furthermore, since a granular powder that is more uniformly dispersed than a crushed product can be obtained, a molded product of higher strength can be obtained by the use of a powder obtained by spray drying. Furthermore, the denseness distribution of the interior of the polishing body can be small and the polishing performance for each polishing process can be stabilized.

The above-mentioned molding process can be formed a residue (in the form of lump, flake, powder, pellet and the like) from which the dispersion medium has been eliminated to some extent, or a dried powder (including a granular product) from which the dispersion medium has been substantially eliminated nearly completely, by performing press molding, extrusion molding, injection molding and the like.

In the case where the elimination of the dispersion medium and molding are to performed simultaneously, the aqueous dispersion may be charged into a desired mold and solidification to the shape of the mold may be performed by eliminating the dispersion medium in the same manner as described above. Also, without using a mold, the aqueous dispersion may be developed across the surface of a layer and the like, which is to be the base material, and thereafter the dispersion medium may be eliminated in the same manner as described above. Various additives, such as those mentioned above, may be added in the molding process.

The above-mentioned "polishing part" exhibits a mechanical and/or chemical polishing effect. The entirety of the polishing body (which for example is of a plate-like shape and particularly of a disk-like shape) in the invention may be comprised of the polishing part. And the polishing body may be the one equipped with the polishing part on the surface of a plate-like body as a supporting part (the shape thereof is not limited and may be disk-like or square-shaped), or the one whose thin polishing part in predetermined shape is arranged in a regular manner on the surface of the polishing body. The material of the supporting part is not particularly restricted and a polyurethane resin (foamed or unfoamed), metal, nonwoven fabric and the like may be used. Among these, a flexible polyurethane resin or a metal (in particular, stainless steel, etc.) is especially preferable.

With the polishing body in the invention, the volume ratio of the abrasive in the polishing body may be 1 to 99% by volume (more preferably 10 to 70% by volume and especially preferably 15 to 50% by volume). The polishing body in the invention is preferably used in the polishing of a semiconductor. Objects to be polished that can be polished by the polishing body include glass, silicon oxide layer, amorphous silicon layer, polycrystalline silicon layer, monocrystalline silicon layer, silicon nitride layer, pure tungsten layer, pure aluminum layer, pure copper layer and the like, as well as layers of an alloy of tungsten, aluminum, copper, and another metal. Objects that can be polished by this polishing body also include layers of oxides and nitrides of such metals as tantalum, titanium.

PREFERRED EMBODIMENTS OF THE INVENTION

This invention will be described more specifically by way of examples and comparative examples. However, this invention is not limited to these examples.

<A> Examples of Use of Thermoplastic Resin as the Matrix Material

[1] Preparation of Non-Crosslinked Type Polishing Bodys (1) Preparation of Aqueous Dispersions A to C and Non-Aqueous Dispersion D ① Aqueous Dispersion A, Having a Matrix Material and Abrasive Dispersed Therein The respective components shown in Table 1 were charged at the respective proportions into a temperature-adjustable autoclave, equipped with a stirrer, and were reacted for 16 hours at 75° C. As a result, the polymerization conversion was 95.8% and an aqueous thermoplastic resin emulsion was obtained in which a copolymer (thermoplastic resin), with a glass transition temperature of 50° C. and an average particle diameter of 166 nm, was dispersed. The particle diameter was measured using a laser particle size analysis system made by Otsuka Electronics Co., Ltd. (in the description that follows, the particle diameter was measured by the same method).

TABLE 1

| Component | Amount (parts) |
| --- | --- |
| Ion-exchanged water | 240 |
| Butadiene | 14.00 |
| Styrene | 71.00 |
| Methylene methacrylate | 12.15 |
| Itaconic acid | 1.85 |
| Acrylic acid | 1.00 |
| á-Methylstyrene dimer | 0.10 |
| t-Dodecylmercaptan | 0.40 |

The emulsion that was obtained as described above was adjusted to pH8.5 by means of a 25% aqueous solution of potassium hydroxide. Thereafter, water (ion-exchanged water) was added and stirring was performed under room temperature using a "Three-One Motor." After incorporating a cerium oxide ($CeO_2$) powder with a particle diameter of 0.3 μm prior to processing, stirring at 1,500 rotations/minute was carried out for 3 minutes to obtain an aqueous dispersion A.

② Aqueous Dispersion B, Having Composite Particles Wherein Abrasive is Attached to a Matrix Material Dispersed The respective components shown in Table 2 were charged at the respective proportions into a flask of 2-liter volume and were made to undergo polymerization under a nitrogen atmosphere by stirring at 70° C. for 6 hours. An emulsion, containing polymethyl methacrylate polymer particles, having an amino group of a cationic functional group, and a functional group with a polyethylene glycol chain, was thereby obtained. The polymerization yield was 95%.

The product of the trade name, "NK Ester M-90G #400", made by Shin-Nakamura Chemical Co., Ltd., was used as the methoxypolyethylene glycol methacrylate in Table 2, and the product of the trade name, "V50", made by Wako Pure Chemicals Industries, Ltd., was used as the azo-based initiator.

TABLE 2

| Component | Amount (parts) |
| --- | --- |
| Ion-exchanged water | 400 |
| Methyl methacrylate | 90.00 |
| Methoxypolyethylene glycol methacrylate | 5.00 |
| 4-Vinylpyridine | 5.00 |
| Azo-based initiator | 2.00 |

The obtained emulsion containing 10% by mass of polymethyl methacrylate polymer particles, was then adjusted to pH10 by means of potassium hydroxide. The zeta potential of the polymethyl methacrylate polymer particles in this emulsion was +17 mV. Meanwhile, the dispersion, which was prepared to contain 10% by mass of a cerium oxide powder with a particle diameter of 0.3 μm prior to processing, was adjusted likewise to pH10. The zeta potential of the cerium oxide in this dispersion was −18 mV. The difference of the zeta potentials of the two components was thus 35 mV.

Thereafter, the above emulsion and dispersion were charged at a mass ratio of 1:1 into a flask of 2-liter volume and then mixed by stirring. 3 parts by mass of tetraethoxysilane were then added into the flask and then stirring for 1 hour at 25° C., followed by stirring for 3 hours at 40° C., was performed. The mixture was then cooled to obtain an aqueous dispersion B wherein composite particles were dispersed. Cerium oxide was attached to 95% of the surface of these composite particles.

③ Aqueous Dispersion C, Having Composite Particles Wherein Abrasive is Attached to a Matrix Material Dispersed The respective components shown in Table 3 were charged at the respective proportions into a flask of 2-liter volume and were made to undergo polymerization under a nitrogen atmosphere by stirring at 70° C. for 6 hours. An emulsion, containing carboxy-modified polystyrene particles, having a carboxyl group and a hydroxyl group, was thereby obtained. The polymerization yield was 95%, and the carboxyl group content as measured by the conductometric titration method was 40% for the carboxy-modified polystyrene particle interior, 50% for the surface, and 10% for the aqueous phase part.

TABLE 3

| Component | Amount (parts) |
| --- | --- |
| Ion-exchanged water | 400 |
| Styrene | 92.00 |
| Methacrylic acid | 4.00 |
| Hydroxyethyl acrylate | 4.00 |
| Ammonium lauryl sulfate | 0.10 |
| Ammonium persulfate | 0.50 |

The obtained emulsion containing 10% by mass of carboxy-modified polystyrene particles, was then adjusted to pH4 by means of nitric acid. The zeta potential of the carboxy-modified polystyrene particles in this emulsion was −40 mV. Meanwhile, the dispersion, which was prepared to contain 10% by mass of cerium oxide powder with an average particle diameter of 0.3 μm prior to processing, was adjusted likewise to pH4. The zeta potential of the cerium oxide in this dispersion was +20 mV. The difference of the zeta potentials of the two components was thus 60 mV.

Thereafter, the above emulsion and dispersion were charged at a mass ratio of 1:1 into a flask of 2-liter volume and then mixed by stirring. 3 parts by mass of tetraethoxysilane was then added into the flask and then stirring for 1 hour at 25° C., followed by stirring for 3 hours at 40° C., was performed. The mixture was then cooled to obtain an aqueous dispersion C wherein composite particles were dispersed. Cerium oxide was attached to 90% of the surface of these composite particles.

④ Non-Aqueous Dispersion D, Having a Matrix Material and Abrasive Dispersed Therein The aqueous dispersion medium of an emulsion obtained in the same manner as in ① was evaporated and dried. Thereafter, the same amount of toluene as the amount of the evaporated and dried aqueous dispersion medium was added and mixing by stirring was performed. The same amount of cerium oxide powder as that used in ① was mixed by stirring into the liquid to thereby obtain non-aqueous dispersion D. As cerium oxide was added, the viscosity of the dispersion increased and it became impossible to continue stirring during the process.

(2) Molding

Each of the aqueous dispersions A to C and non-aqueous dispersion D obtained in (1) was spread thinly across a polyethylene film and made flake-like in form by leaving and drying for 48 hours under room temperature. Each flake-like product thus obtained was then formed using a mold press to thereby obtain disk-shaped polishing bodys A to D of 30 cm diameter and 3 mm thickness. The polishing bodys A to C are in the invention while polishing body D is a comparative example.

[2] Evaluation of the Dispersion Property of the Abrasive and Evaluation of the Polishing Bodys A to D (1) Evaluation of the Dispersion Property of the Abrasive For each of the aqueous dispersions A to D, the dispersion medium was eliminated, the resulting residue was magnified by a transmission electron microscope, and the maximum diameters of 50 abrasive were measured respectively using the electron microscope photograph that was taken, and the average maximum diameter was calculated as the average value of the measured values. The results are shown in Table 4.

(2) Evaluation of Polishing Performance

① Measurement of Removal Rate

Each of the polishing bodys A to D was adhered onto the surface table of a polishing device (model "LM-15," made by Lapmaster STF Corp.) and a 4 cm-square thermally oxidized layer wafer was polished while supplying just water at a rate of 150 cc per minute. The other polishing conditions were; a table rotation speed of 50 rpm, head rotation speed of 50 rpm, polishing pressure of 350 g/cm$^2$, and polishing time of 2 minutes. The removal rate was then calculated from the results by using the following formula (1).

Removal rate(Å/minute)=(Thickness of oxide layer before polishing−Thickness of oxide layer after polishing)/Polishing time     (1)

② Evaluation of Scratching

The surfaces of wafers polished in ① were observed visually and evaluated. The results are shown in Table 4. In Table 4, "None" indicates that no scratches whatsoever could be found by visual observation. "Numerous" indicates that numerous scratches were observed by visual observation.

TABLE 4

|  | Polishing body A (Example) | Polishing body B (Example) | Polishing body C (Example) | Polishing body D (Comparative example) |
|---|---|---|---|---|
| Primary particle diameter (μm) |  |  | 0.3 |  |
| Secondary particle diameter (μm) | 0.3 | 0.3 | 0.4 | 2.0 |
| Removal rate (Å/minute) | 2,000 | 1,800 | 1,700 | 1,800 |
| Scratches | None | None | None | Numerous |

According to the results in Table 4, whereas the particle diameter of the abrasive prior to processing was 0.3 μm, the particle diameter became 0.3 to 0.4 μm in the condition immediately prior to forming into the polishing body. That is, the particle diameter became 1 to 1.3 times the average particle diameter and it is thus predicted that the abrasive was contained in the polishing body without changing in particle diameter from that prior to processing. Meanwhile, whereas the particle diameter prior to processing was 0.3 μm in regard to the polishing body D, which is not of the invention, the particle diameter became 2.0 μm in the condition immediately prior to forming into the polishing body. That is, the particle diameter increased by 7.3 times the average particle diameter and it is thus predicted that the abrasive was largely aggregated in the polishing body D as well. Also, whereas visually recognizable scratches were not seen on the wafers polished by the polishing bodys of the polishing bodys A to C, numerous scratches were seen on the wafer polished by the polishing body D.

<B> Examples of Use of Thermosetting Resin as the Matrix Material

[1] Preparation of Crosslinked Type Polishing Bodys (1) Preparation of Aqueous Dispersions E to G (a) Aqueous Thermosetting Resin a The aqueous epoxy resin "EM101-50," made by Asahi Denka Kogyo K.K. (solid content; 50% by mass), was used.

(b) Aqueous Thermoplastic Resin b

The aqueous thermoplastic resin emulsion (solid content; 48% by mass) described above, was used.

① Aqueous Dispersion E, Having a Thermosetting Resin-Based Matrix Material and Abrasive Dispersed Therein The aqueous thermosetting resin a was adjusted to pH8.5 by means of a 25% aqueous solution of potassium hydroxide. Water (ion-exchanged water) was then added and stirring was performed at room temperature using a "Three-One Motor." After incorporating a cerium oxide (CeO$_2$) powder with a particle diameter of 0.3 μm prior to processing, the curing agent "EH-3615S" was incorporated and stirring at 600 rotations/minute was carried out for 3 minutes to obtain an aqueous dispersion E.

② Aqueous Dispersion F, Having Dispersed Therein a Matrix Material, in which a Thermosetting Resin-Based is Combined with a Thermoplastic Resin-Based, and Abrasive The aqueous thermoplastic resin b and water (ion-exchanged water) were added to aqueous thermosetting resin a and stirring at room temperature was performed. The proportions of the solid content of the aqueous thermosetting resin a and the aqueous thermoplastic resin b were set so that the aqueous thermosetting resin a will comprise 50% by mass based on the total of both resins.

The dispersion was then adjusted to pH8.5 by means of a 25% aqueous solution of potassium hydroxide. After then incorporating a cerium oxide ($CeO_2$) powder with a particle diameter of 0.3 µm prior to processing, the above-mentioned curing agent "EH-3615S" was incorporated and stirring at 600 rotations/minute was carried out for 3 minutes to obtain an aqueous dispersion F.

③ Aqueous Dispersion G, Having a Thermoplastic Resin and Abrasive Dispersed Therein Water (ion-exchanged water) was added to aqueous thermoplastic resin b and stirring was performed at room temperature. The dispersion was then adjusted to pH8.5 by means of a 25% aqueous solution of potassium hydroxide. After then incorporating a cerium oxide ($CeO_2$) powder with a particle diameter of 0.3 µm prior to processing, the above-mentioned curing agent "EH-3615S" was incorporated and stirring at 600 rotations/minute was carried out for 3 minutes to obtain an aqueous dispersion G.

(2) Molding

Each of the aqueous dispersions E to G obtained in (1) was spread thinly across a polyethylene film and made flake-like products in form by leaving and drying for 48 hours under room temperature. Each flake-like product thus obtained was then formed using a mold press to thereby obtain disk-shaped polishing bodys E to G of 30 cm diameter and 3 mm thickness. Polishing bodys E and F are in the invention (examples) while polishing body G is a comparative example.

[2] Evaluation of Machinability and Evaluation of Polishing Bodys E to G (1) Cutting Cutting of the surface was carried out in order to increase the surface precision of each of the polishing bodys of 30 cm diameter and 3 mm thickness. A machining center was used for cutting and an end mill was used as the cutting tool. The cutting amount was set to 0.02 mm and the feeding speed was set to 100 mm/minute.

(2) Evaluation of Machinability

The machinability was evaluated by comparison of the removal rate before and after cutting. Each of the polishing bodys A to C was adhered onto the surface table of a polishing device (model "LM-15," made by Lapmaster STF Corp.) and a 4 cm-square thermally oxidized layer wafer was polished while supplying just water at a rate of 150 cc per minute. The other polishing conditions were a table rotation speed of 50 rpm, head rotation speed of 50 rpm, polishing pressure of 350 g/cm², and polishing time of 2 minutes. The dressing conditions were; a dresser number of #100, table rotation speed of 30 rpm, head rotation speed of 30 rpm, dressing pressure of 300 g/cm², and dressing time of 10 minutes. The removal rate was then calculated from the results by using the following formula (1).

Removal rate(Å/minute)=(Thickness of oxide layer before polishing−Thickness of oxide layer after polishing)/Polishing time  (1)

The polishing results are shown in Table 5.

TABLE 5

|  | Units | Polishing body E (thermosetting resin) | | Polishing body F (thermosetting resin + thermoplastic resin) | | Polishing body G (thermoplastic resin) | |
| --- | --- | --- | --- | --- | --- | --- | --- |
|  |  | Uncut | Cut | Uncut | Cut | Uncut | Cut |
| Distribution of thickness (maximum) |  | 110 | 25 | 100 | 20 | 100 | 20 |
| Removal rate; without dressing | Å/minute | 1,100 | 1,300 | 1,000 | 1,300 | 1,000 | 250 |
| Removal rate; with dressing | Å/minute | 1,100 | 1,500 | 1,000 | 1,500 | 1,000 | 25 |

According to the results in Table 5, the distribution of thickness of the polishing body as a whole were small as intended for all polishing bodys E to G. With regard to the removal rate, those of the cutting products of polishing bodys E and F was large in comparison to those of the uncutting products, but the removal rate of the cutting product using the polishing body G became considerably low. This is because with polishing bodys E and F, the distribution of the thickness was made low by cutting. On the other hand, with the comparative example polishing body G, though the distribution of thickness was made low, it is considered that surface of the polishing body melted slightly due to the heat during cutting and the surface thus became deteriorated somewhat. In contrast, deterioration of the surface was not seen with the polishing bodys E and F of the invention.

<C> Example of Employment of the Spray Drying Method

Using the aqueous dispersion A described above, the spray drying method was carried out under the following operation conditions to obtain granular particles of an average particle diameter of 60 µm.

[Spray Drying Method Conditions]

Equipment used; "OC-16"; made by Ohkawara Kakohki Co., Ltd., spraying disk diameter; 65 mm, inlet temperature; 160° C., outlet temperature; 65° C., spraying disk rotation speed; 15,000 rpm, stock solution treatment rate; 12 kg/h.

This dried powder was then molded using a powder press to obtain a polishing body H.

As a result of testing the flexural strength of the polishing body H by the method described below, it was found that whereas the flexural strength of the polishing body E, measured in the same manner, was 130 kgf/cm², that of the polishing body H was 330 kgf/cm². This comparison of the two polishing bodys shows that the polishing body H excels in terms of flexural strength.

[Test Method]

A test in compliance with ASTM 638 was performed using the Instron Universal Material Tester 4204.

What is claimed is:

1. A polishing body, comprising:
   a polishing part with a predetermined shape molded from a residue or a dried powder;
   said residue or dried powder being prepared by eliminating a dispersion medium from an aqueous dispersion comprising dispersed composite particles comprising an abrasive attached to a matrix material,
   said abrasive being dispersed in said matrix material,
   wherein the respective zeta potentials of said matrix material and said abrasive are opposite in sign and the difference of said zeta potentials is 5 mV or more.

2. The polishing body according to claim 1, wherein said dispersion medium is eliminated by spray drying.

3. The polishing body according to claim 1, wherein said aqueous dispersion further comprises a matrix material and/or an abrasive.

4. The polishing body according to claim 1, wherein the polishing body is adapted for the polishing of semiconductors.

5. A polishing body, comprising:
   a polishing part with a predetermined shape molded from a residue or a dried powder;
   said residue or dried powder being prepared by eliminating a dispersion medium from an aqueous dispersion comprising dispersed composite particles comprising an abrasive attached to a matrix material, said matrix material comprising a crosslinkable polymer,
   said crosslinkable polymer being crosslinked during elimination of said dispersion medium, or during molding, or after molding, thereby obtaining a crosslinked structure, and
   said abrasive being dispersed in said matrix material,
   wherein the respective zeta potentials of said matrix material and said abrasive are opposite in sign and the difference of said zeta potentials is 5 mV or more.

6. The polishing body according to claim 5, wherein said dispersion medium is eliminated by spray drying.

7. The polishing body according to claim 5, wherein the polishing body is adapted for the polishing of semiconductors.

8. A polishing pad, which comprises the polishing body according to claim 1.

9. A polishing pad, which comprises the polishing body according to claim 5.

10. A method for polishing of semiconductors, comprising:
    polishing a semiconductor with the polishing body according to claim 1.

11. A method for polishing of semiconductors, comprising:
    polishing a semiconductor with the polishing body according to claim 5.

12. A polishing body, comprising:
    a polishing part with a predetermined shape molded from a residue or a dried powder;
    said residue or dried powder being prepared by eliminating a dispersion medium from an aqueous dispersion comprising dispersed composite particles comprising an abrasive attached to a matrix material
    wherein the respective zeta potentials of said matrix material and said abrasive are opposite in sign and the difference of said zeta potentials is 5 mV or more.

13. The polishing body according to claim 12, wherein said dispersion medium is eliminated by spray drying.

14. The polishing body according to claim 12, wherein said aqueous dispersion further comprises a matrix material and/or an abrasive.

15. The polishing body according to claim 12, wherein the polishing body is adapted for the polishing of semiconductors.

16. A polishing body, comprising:
    a polishing part with a predetermined shape molded from a residue or a dried powder;
    said residue or dried powder being prepared by eliminating a dispersion medium from an aqueous dispersion containing dispersed composite particles comprising an abrasive attached to a matrix material, said matrix material comprising a crosslinkable polymer,
    said crosslinkable polymer being crosslinked during elimination of said dispersion medium, or during molding, or after molding, thereby obtaining a crosslinked structure,
    wherein the respective zeta potentials of said matrix material and said abrasive are opposite in sign and the difference of said zeta potentials is 5 mV or more.

17. The polishing body according to claim 16, wherein said dispersion medium is eliminated by spray drying.

18. The polishing body according to claim 16, wherein the polishing body is adapted for the polishing of semiconductors.

19. A polishing pad, which comprises the polishing body according to claim 12.

20. A polishing pad, which comprises the polishing body according to claim 16.

21. A method for polishing of semiconductors, comprising: polishing a semiconductor with the polishing body according to claim 12.

22. A method for polishing of semiconductors, comprising: polishing a semiconductor with the polishing body according to claim 16.

* * * * *